(12) United States Patent
Ahlgren et al.

(10) Patent No.: US 8,473,379 B2
(45) Date of Patent: Jun. 25, 2013

(54) DYNAMIC CENTRALIZED UNIT DETERMINATION IN A CREDIT CONTROL CHARGING SYSTEM

(75) Inventors: Petter Ahlgren, Ronneby (SE); Marcus Karlsson, Karlskrona (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 339 days.

(21) Appl. No.: 12/650,365

(22) Filed: Dec. 30, 2009

(65) Prior Publication Data

US 2011/0161216 A1 Jun. 30, 2011

(51) Int. Cl.
*G07F 19/00* (2006.01)
*H04M 15/00* (2006.01)

(52) U.S. Cl.
USPC ........................................ 705/34; 379/114.28

(58) Field of Classification Search
USPC ........................................................... 705/34
See application file for complete search history.

(56) References Cited

U.S. PATENT DOCUMENTS

| | | | |
|---|---|---|---|
| 8,141,165 B2* | 3/2012 | Ginter et al. | 726/27 |
| 2007/0179974 A1 | 8/2007 | Cai et al. | |
| 2008/0040267 A1* | 2/2008 | Krishnamoorthy et al. | 705/40 |
| 2008/0205614 A1* | 8/2008 | Cai et al. | 379/114.28 |
| 2009/0299820 A1* | 12/2009 | Wang et al. | 705/10 |

FOREIGN PATENT DOCUMENTS

WO WO 2004/036825 A1 4/2004

OTHER PUBLICATIONS

3GPP TS 32.296 V8.2.0 (Jun. 2008).*
3GPP TS 32.299 V7.7.0, "3$^{rd}$ Generation Partnership Project; Technical Specification Group Service and System Aspects; Telecommunication management; Charging management; Diameter charging applications (Release 7)", Sep. 2007, pp. 1-120.
H. Hakala et al., "Diameter Credit-Control Application", Network Working Group, Aug. 2005, pp. 1-114.
ETSI TS 132 240 V7.2.0, "Digital cellular telecommunications system (Phase 2+); Universal Mobile Telecommunications System (UMTS); Telecommunications management; Charging management; Charging architecture and principles (3GPP TS 32.240 version 7.2.0 Release 7)", Mar. 2007, pp. 1-45.
ETSI TS 132 251 V7.5.1, "Digital cellular telecommunications system (Phase 2+); Universal Mobile Telecommunications System (UMTS); Telecommunications management; Charging management; Packet Switched (PS) domain charging (3GPP TS 32.251 version 7.5.1 Release 7)", Oct. 2007, pp. 1-67.

(Continued)

*Primary Examiner* — Garcia Ade
(74) *Attorney, Agent, or Firm* — Myers Bigel Sibley & Sajovec

(57) ABSTRACT

A charging system includes a rating engine, a session control module, and a charging unit determination module. The session control module receives a request for service units, associated with a charging session, from a client or service element, and obtains one or more input parameters from the request for service units. The charging unit determination module obtains account data associated with the request for service units, determines at least one charging session related parameter based on the one or more input parameters and/or the account data, and pass the at least one charging session related parameter to the rating engine. The rating engine grants service units based on the at least one charging session related parameter, and forwards an indication of the granted service units to the session control module for return to the client or service element.

19 Claims, 16 Drawing Sheets

OTHER PUBLICATIONS

"3GPP TS 32.296 V8.2.0 (20008-06); $3^{rd}$ Generation Partnership Project; Technical Specification Group Service and System Aspects; Telecommunication management; Online Charging System (OCS): Application and interfaces (Release 8)", 3GPP TS 32.296 V8.2.0, vol. 32.296, No. V8.2.0, Jun. 17, 2008, pp. 1-77, XP002525705, p. 11, line 1—p. 50, last line.

"Digital cellular telecommunications system (Phase 2+); Universal Mobile Telecommunications System (UMTS); LTE; Policy and charging control architecture (3GPP TS 23.203 version 8.6.0 Release 8)", Technical Specification, European Telecommunications Standards Institute (ETSI), 650, Route Des Lucioles; F-06921 Sophia-Antipolis; France, No. V8.6.0, Jun. 1, 2009, XP014044524, p. 16, Line 4—p. 56, last line; figure 5.1.1 p. 78, line 1—p. 85, line 28; figure 7.2.1.

Grgic et al.; "Policy-based charging in IMS for multimedia services with negotiable QoS requirements", CAD Systems in Microelectronics, 2009. CADSM 2009$10^{th}$ International Conference—The Experience of Designing and Application of, IEEE, Piscataway, NJ, USA, Jun. 8, 2009, pp. 257-264, XP031514058.

International Search Report and Written Opinion corresponding to International Application No. PCT/SE2010/051205; Date of Mailing: Jul. 13, 2011; pages.

Kuhne et al: "Architecture for a service-oriented and convergent charging in 3G mobile networkds and beyond", $6^{th}$ IEEE Conference on 3G and Beyond (05/11182), vol. 2005, Jan. 1, 2005, pp. 517-521, XP55001530.

International Preliminary Report on Patentability for corresponding application No. PCT/SE2010/051205, mailed Mar. 9, 2012, 46 pages.

* cited by examiner

700

Root_ID
    Definitions
    UnitType based on roaming position
        FieldSelection (Service Identifier = 0)
        Roaming
            FieldSelection (SGSN-Address IP mask = 192.0.0.0)
            SetField (UnitType = "Seconds")
            SetField (RequestedUnits = 120)
        Not roaming
            SetField (UnitType = "Bytes")
            SetField (RequestedUnits = 1000000)

DYNAMIC CENTRALIZED UNIT DETERMINATION IN A CREDIT CONTROL CHARGING SYSTEM

TECHNICAL FIELD

Implementations described herein relate generally to credit-control systems and, more particularly, to the implementation of dynamic centralized unit determination in a credit control charging system based on service unit requests.

BACKGROUND

Credit control may involve mechanisms that interact in real-time with accounts associated with end users, and may control or monitor the charges related to service usage associated with those end users' accounts. For example, credit control may involve checking whether credit is available for a given account, reserving credit, deducting credit from the end user account when service is completed, and/or refunding reserved credit that is not used. Credit control has particular applicability in the provision of network services, such as, for example, provision of cellular airtime in a cellular radio network, provision of multimedia data in a wired or wireless network, etc. Credit control may be implemented by a charging system (e.g., a credit control server) that monitors and controls charges related to service usage of end users, and that grants and/or denies credit authorizations to those end users, thus, enabling network service delivery to the end users.

RFC 4006, entitled "Diameter Credit-Control Application" (DCCA), provides a specification that can be used to implement real-time credit-control for a variety of end user services such as network access services, Session Initiation Protocol (SIP) services, messaging services, and download services. RFC 4006 provides a general solution to real-time cost and credit-control in charging systems.

SUMMARY

A credit control charging session typically involves the receipt of a request for service units at a charging system (e.g., the credit control server) that checks credit availability, reserves service units, and/or grants service units to an end user that is using a network service. Upon receipt of the request for service units, the charging system may perform various functions to enable the charging system to grant service units to the end user. Mechanisms for granting service units during a credit control charging session typically lack the capacity to determine charging session related parameters in ways that satisfy market requirements. For example, mechanisms for granting service units during a credit control charging session lack the capacity to determine charging session related parameters (e.g., unit type, validity time, etc.) based on, for example, certain input parameters (e.g., roaming position, etc.) obtained from the request for service units or based on certain account data (e.g., a particular offered campaign) associated with the end user.

Exemplary embodiments described herein relate to centralized unit determination that may be performed at a charging system, during the service unit granting process, in response to a request for service units received in association with an end user's charging session. As described herein, a dynamic centralized unit determination module may be implemented in the charging system using dynamically configurable logic to implement the centralized unit determination. The centralized unit determination may include determining one or more charging session related parameters based on input parameters contained in the request for service units and based on account data of an account associated with the end user. The charging session related parameters may include a service unit type (e.g., service unit type of time, data volume, or money) to be granted to the charging session, or other charging session related data. The other charging session related data may include parameters, other than service unit type, related to a particular charging session (e.g., a validity-time parameter which can be used for a service unit reservation that depends on account parameters). The determined charging session related parameters may be used by a rating engine of the charging system to grant an amount of service units to the end user and/or may be returned to a client and/or service element that is engaged in providing a network service to the end user. Use of the dynamic centralized unit determination module, described herein, advantageously enables the determination of unit type, and/or other charging session related parameters, based on various different input parameters obtained from request for service units, or from end user account data. By implementing the dynamic centralized unit determination module with dynamically configurable logic, the determination of unit type, and/or charging session related parameters, may be performed in a flexible way that may be easily re-configured based upon end user or service provider needs or requirements.

According to one aspect, a charging system may include a rating engine, and a session control module to: receive a request for service units, associated with a charging session, from a client or service element that is providing a network service to an end user, and obtain one or more input parameters from the request for service units. The charging system may further include a charging unit determination module to: obtain account data associated with the request for service units from an account balance management module, determine at least one charging session related parameter based on the one or more input parameters and/or the account data, and pass the at least one charging session related parameter to the rating engine. The rating engine is to: grant service units based on the at least one charging session related parameter, and forward an indication of the granted service units to the session control module for return to the client or service element.

According to a further aspect, a method implemented in a charging system may include receiving a request for service units, associated with a charging session, from a client or service element that is providing a network service to an end user, and obtaining one or more input parameters from the request for service units. The method may further include obtaining account data associated with the request for service units, and determining at least one charging session related parameter based on the one or more input parameters and/or the account data. The method may also include granting service units based on the at least one charging session related parameter, and sending an indication of the granted service units to the client or service element.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Figure 1A:
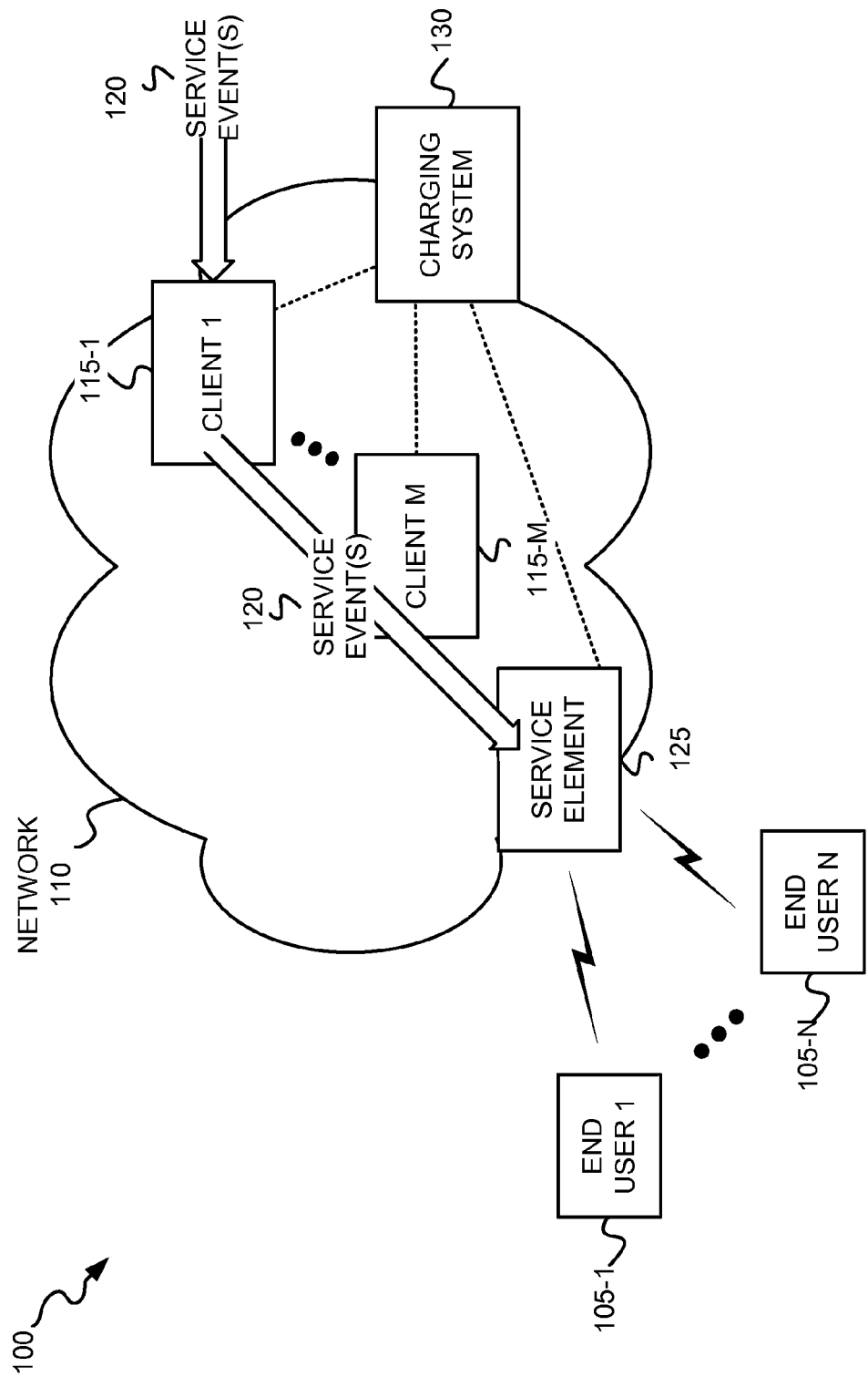
FIG. 1A illustrates an exemplary system in which a network service(s) may be provided to one or more end users.

FIG. 1A illustrates an exemplary system 100 in which a network service(s) may be provided to one or more end users. As shown in FIG. 1A, system 100 may include end users 105-1 through 105-N connected to a network 110. Network 110 may include clients 115-1 through 115-M that act as intermediate devices for forwarding a service event 120 associated with a network service to a service element 125, which provides the network service to end users 105-1 through 105-N. Each of clients 115-1 through 115-M may include a credit-control client (e.g., a Diameter Credit control client as specified in IETF RFC 4006) that interacts with a credit-control server, such as, for example, charging system 130. Each of clients 115-1 through 115-M may monitor usage of a service grant according to instructions provided by charging system 130 (e.g., the credit-control server). Service element 125 may include a network element or device that provides a network service to end users 105-1 through 105-N. In some implementations, service element 125 and a client (e.g., client 115-M) may be combined into a single network element or device, and service element 125/client 115-M may act as a credit-control client. Examples of service element 125 may include a network access server (NAS), a SIP proxy server, a Serving General Packet Radio Service (GPRS) Support Node (SGSN), a GPRS node, or an Application server, such as, for example, a messaging server, a content server, and/or a gaming server.

Charging system 130 may include a server entity that performs credit-control associated with one or more network services. Charging system 130 may perform the credit-control before a service event is delivered to one or more end users 105-1 through 105-N. In implementations described herein, charging system 130 may implement dynamic centralized unit determination based on, for example, input parameters contained in service unit requests (e.g., Request for Service Units (RSU)) and based on account data associated with end users 105-1 through 105-N.

As shown in FIG. 1A, a service event 120, intended for one or more of end users 105-1 through 105-N, may be received by client 115-1. Client 115-1 may forward service event 120 to client 115-M which, in turn, may forward service event 120 to service element 125 for provision of the associated service to one or more of end users 105-1 through 105-N. In conjunction with the forwarding of service event 120, each of clients 115-1 through 115-M may send a charging request (e.g., a request for service units—not shown) to charging system 130 requesting authorization/denial of delivery of service event 120 to a respective one of end users 105-1 through 105-N. In response to each charging request, charging system 130 may send an authorization message that grants delivery of the service (e.g., delivery of a granted quota of service units) to the respective end user, or a denial message that denies delivery of the service to the respective end user based on performance of credit-control mechanisms.

Each of end users 105-1 through 105-N may include a cellular radiotelephone, a personal digital assistant (PDA), a Personal Communications Systems (PCS) terminal, a laptop computer, a desktop computer, a palmtop computer, or any other type of device or appliance that includes a communication transceiver that permits the device to communicate with other devices. A PCS terminal may combine a cellular radiotelephone with data processing, facsimile, and data communications capabilities. A PDA may include a radiotelephone, a pager, an Internet/intranet access device, a web browser, an organizer, calendars, and/or a global positioning system (GPS) receiver. A PCS or PDA may include a Session Initiation Protocol (SIP) User Agent (SIP UA) which may be used for SIP signaling in a Internet Protocol (IP) Multimedia Subsystem (IMS) domain.

Network 110 may include one or more networks of any type, including a local area network (LAN); a wide area network (WAN); a metropolitan area network (MAN); a telephone network, such as a Public Switched Telephone Network (PSTN) or a Public Land Mobile Network (PLMN); a satellite network; an intranet, the Internet; or a combination of these and/or other types of networks. The PLMN(s) may further include a packet-switched sub-network, such as, for example, General Packet Radio Service (GPRS), Cellular Digital Packet Data (CDPD), a Mobile Internet Protocol (IP) network, or an IMS network.

It will be appreciated that the components illustrated in FIG. 1A are shown by way of example. Other configurations with more components, fewer components, different components, or a different arrangement of components may be implemented. Moreover, in some embodiments, one or more components in FIG. 1A may perform one or more of the tasks described as being performed by one or more other components in FIG. 1A.

Figure 1B:
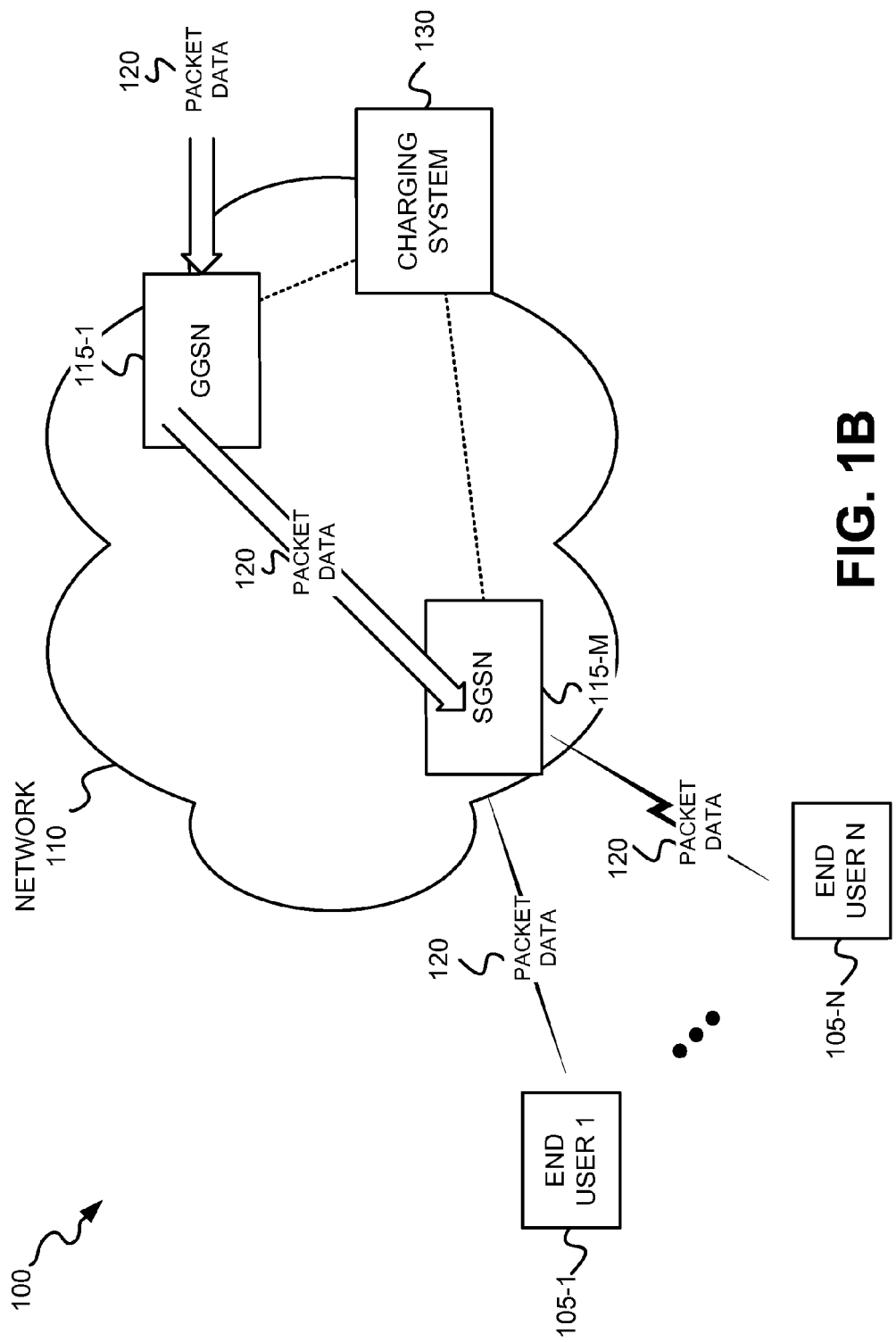
FIG. 1B illustrates an exemplary implementation of the system of FIG. 1A in which one client includes a gateway GPRS support Node (GGSN) and another client includes a Serving General Packet Radio System (GPRS) Support Node (SGSN)

FIG. 1B illustrates system 100 in an exemplary implementation in which client 115-1 includes a Gateway GPRS Support Node (GGSN) and client 115-M includes a SGSN. In the exemplary implementation of FIG. 1B, SGSN combines the functionality of client 115-M and service element 125 of FIG. 1A, and the service event (i.e., service event 120 of FIG. 1A) includes packet data 120 that is being delivered to one or more of end users 105-1 through 105-N. Upon receipt of packet data 120, GGSN 115-1 may forward packet data 120 to SGSN 115-M for possible delivery to one or more of end users 105-1 through 105-N. GGSN 115-1 additionally may send a charging request (e.g., a request for service units—not shown) to charging system 130 requesting authorization/denial of delivery of packet data 120 to one or more of end users 105-1 through 105-N. SGSN 115-M may receive packet data 120 from GGSN 115-1 and may also send a charging request (not shown) to charging system 130. Upon receipt of the authorization/denial from charging system 130, SGSN 115-M may either deliver, or not deliver, packet data 120 to one or more of end users 105-1 through 105-N.

Figure 2:
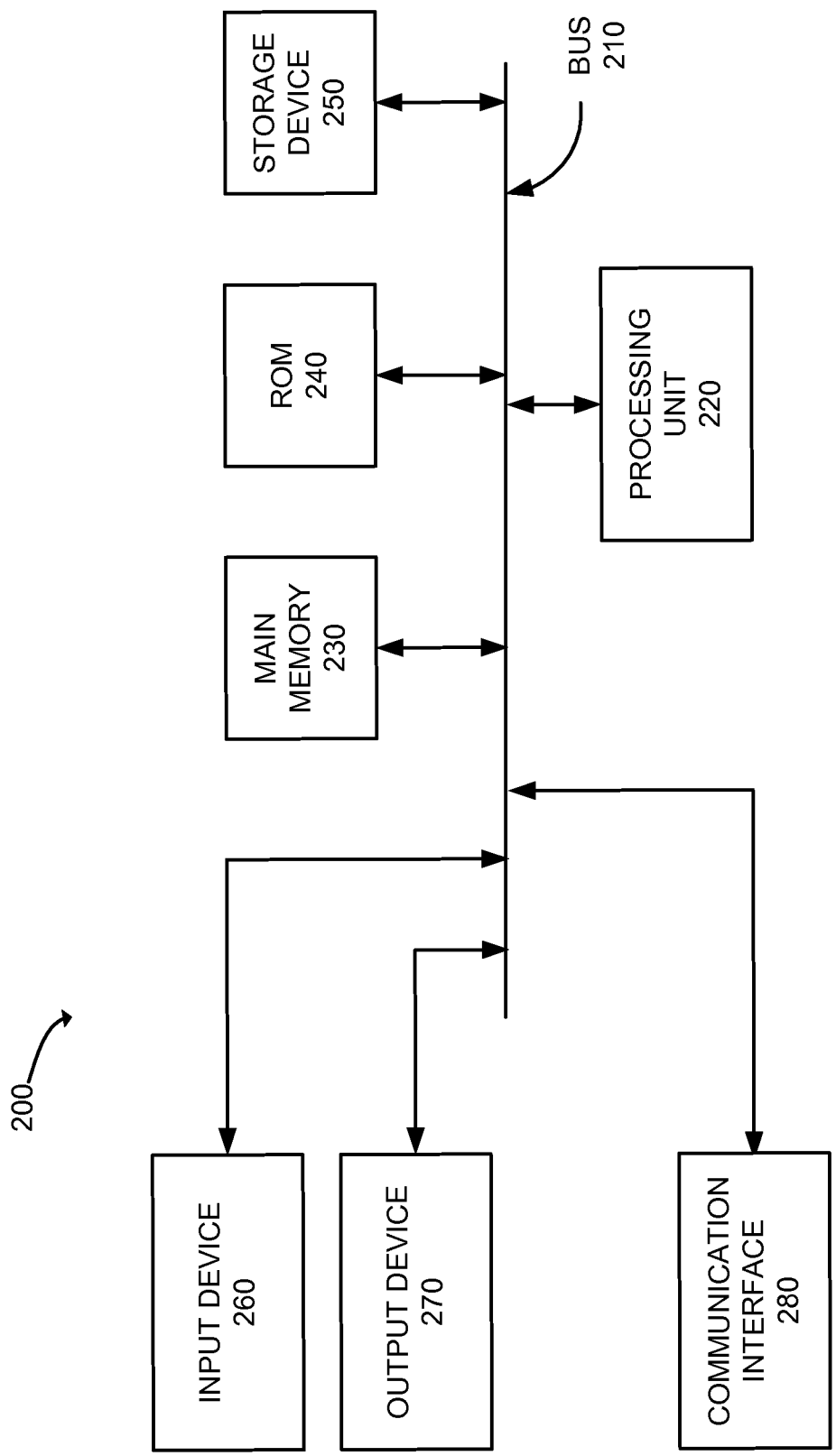
FIG. 2 illustrates exemplary components of a device that may correspond to the charging system of FIG. 1A.

FIG. 2 is a diagram of a device 200, which may correspond to one or more of clients 115-1 through 115-M, service element 125, and/or charging system 130, according to an exemplary implementation. As illustrated, device 200 may include a bus 210, a processing unit 220, a main memory 230, a Read Only Memory (ROM) 240, a storage device 250, an input device 260, an output device 270, and a communication interface 280. Bus 210 may include a path that permits communication among the components of device 200.

Processing unit 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, voice recognition, a touch screen display, and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 110.

Device 200 may perform certain operations/processes described herein. Device 200 may perform these operations in response to processing unit 220 executing software instructions contained in a computer-readable medium, such as memory 230, ROM 240, and/or storage device 250. A computer-readable medium may be defined as a physical or logical memory device. Each of main memory 230, ROM 240 and storage device 250 may include computer-readable media. The magnetic and/or optical recording media (e.g., readable CDs or DVDs) of storage device 250 may also include computer-readable media.

The software instructions may be read into memory 230 from another computer-readable medium, such as storage device 250, or from another device via communication interface 280. The software instructions contained in memory 230 may cause processing unit 220 to perform operations or processes described herein. Alternatively, hardwired circuitry may be used in place of or in combination with software instructions to implement processes described herein. Thus, implementations described herein are not limited to any specific combination of hardware circuitry and software.

It will be appreciated that the components illustrated in FIG. 2 are shown by way of example. Other configurations with more components, fewer components, different components, or a different arrangement of components may be implemented. Moreover, in some embodiments, one or more components in FIG. 2 may perform one or more of the tasks described as being performed by one or more other components in FIG. 2.

Figure 3:
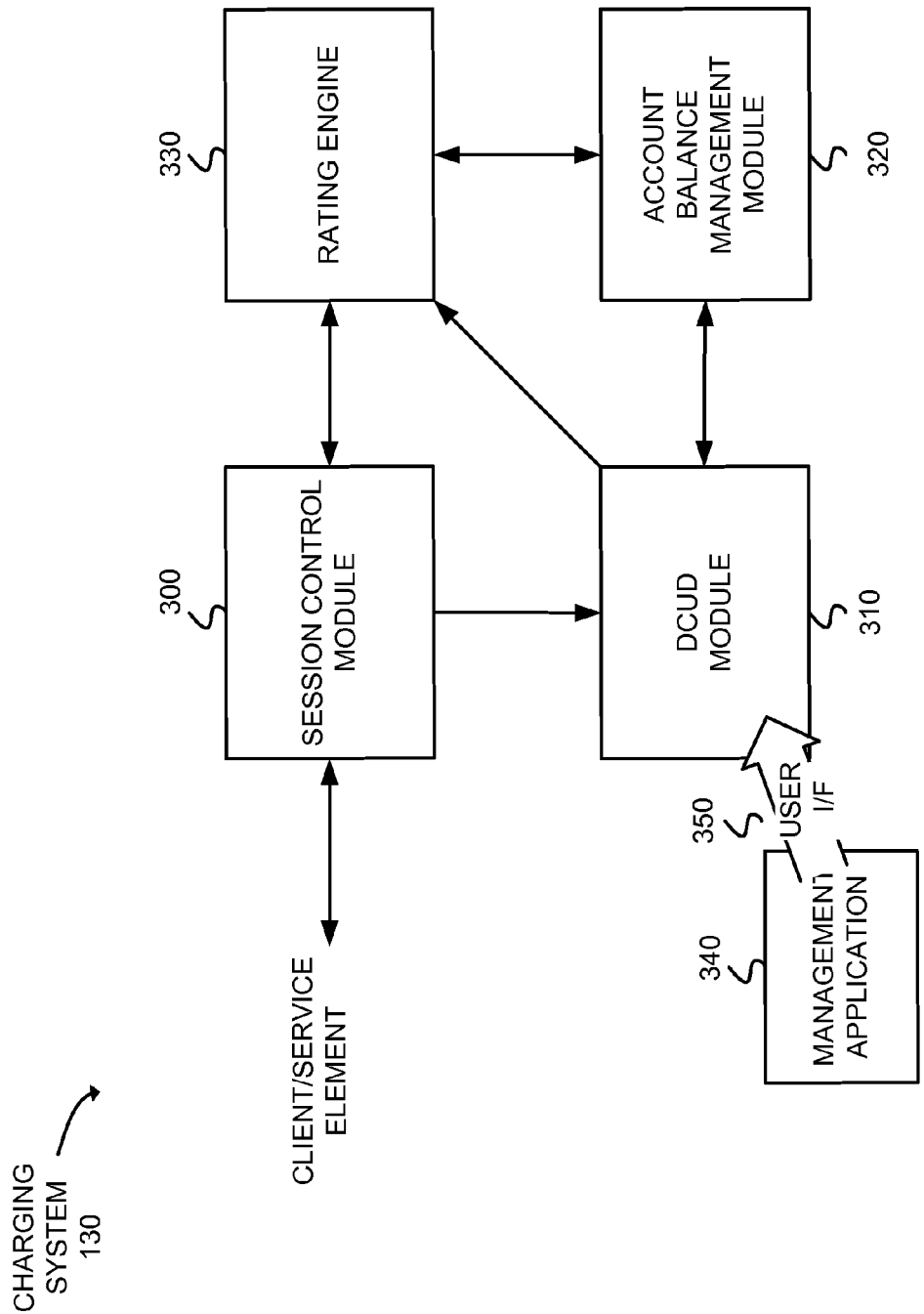
FIG. 3 illustrates exemplary functional components of the charging system of FIG. 1A.

FIG. 3 depicts a diagram of exemplary functional components of charging system 130. The functional components of charging system 130 may include a session control module 300, a dynamic centralized unit determination (DCUD) module 310, an account balance management module 320, and a rating engine 330. FIG. 3 further depicts a management application 340, and a user interface (I/F) 350 that may be used for providing new logic, or for modifying existing logic, used by DCUD module 310. Management application 340 and user I/F 350 may be implemented by charging system 130, or by an external entity that may communicate with charging system 130. The functional components illustrated in FIG. 3 may be implemented in hardware or a combination of hardware and software. In one embodiment, one or more of the functional components illustrated in FIG. 3 may be implemented by one or more of the components illustrated in FIG. 2.

Session control module 300 may receive charging requests associated with charging sessions from clients 115-1 through 115-M. Session control module 300 may process the charging requests to obtain one or more input parameters from the charging requests. The one or more input parameters may include, but are not limited to, an SGSN address of the SGSN serving an end user, the GGSN address of the GGSN serving the end user, the Mobile Country Code (MCC) associated with the location of the end user, the Mobile Network Code (MNC) associated with the location of the end user, and/or a service class of the end user's traffic. Session control module 300 may pass the input parameters to dynamic centralized unit determination (DCUD) module 310 and to rating engine 330.

DCUD module 310 may receive the input parameter(s) from session control module 300 and may obtain account data, associated with the charging requests, from account balance management module 320. DCUD module 310 may include dynamically configurable logic for performing, among other functions, unit type determination (i.e., a type of service unit to be granted, such as, time, volume, or money) based on the input parameters and the account data as configured through interface 350 using Management Application 340. DCUD module 310 may also include dynamically configurable logic for determining other charging session related parameters based on the input parameters, the account data and/or other data. The other charging session related parameter(s) may include, for example, one or more of the following parameters that are defined in "Diameter Charging Applications," 3GPP TS 32.299 V7.7.0 2007-09: 1) a trigger parameter(s); 2) a threshold parameter(s); 3) a Continuous Time Period (CTP) or Discrete Time Period (DTP) parameter(s); 4) an envelope reporting parameter(s); 5) a Quota Holding Time (QHT) parameter(s); and 6) a Quota Consumption Time (QCT) parameter(s). For example, the QCT parameter(s) may be determined based on account data associated with the end user (e.g., based on whether the end user is participating in a particular offer or is a member of a particular group). The QCT parameter(s) may inform the client or service element to "over consume" (i.e., consume units even though no traffic flows) during a time period specified by the QCT parameter(s). As another example, the CTP or DTP parameters may be determined based on account data associated with the end user (e.g., based on whether the end user is participating in a particular offer or is a member of a particular group). The CTP or DTP parameters may inform the client or service element of time envelopes which define rules of consumption to be applied to downloaded units.

DCUD module 310 may pass the determined service unit type to rating engine 330. DCUD module 310 may also pass the determined other charging session related parameters to rating engine 330, and to session control module 300 for return to the client or service element. The configurable logic used by DCUD module 310 may include any type of logic, such as, for example, Javascript, Python, or Perl programmable logic. In one implementation, the configurable logic used by DCUD module 310 may include a logical tree structure that further includes various "branches." Each of the branches may include conditions and modifiers, as described in further detail below with respect to FIG. 4, where the conditions may cause branching within the logical tree structures based on the input parameters and the account data, to execute the modifiers to determine at least one charging session parameter.

Account balance management module 320 may maintain account data (e.g., account balance information) for accounts associated with each of end users 105-1 through 105-N. Account balance management module 320 may supply the account data to DCUD module 310 or rating engine 330 based on credit requests associated with respective ones of end users 105-1 through 105-N. The account data may include, but is not limited to, a current monetary value of a main account associated with an end user, a current value of promotional accounts associated with the end user, a current value of usage accumulators (UAs) associated with the end user, promotions and campaigns offered to the end user, family and friend numbers associated with the end user, and communities to which the end user belongs. Each account associated with an end user may store the above-noted account information, and possibly other information.

Rating engine 330 may use the input parameters, the account data, the determined service unit type, the other charging session related data, and/or other data to reserve service units related to a respective charging request, and/or to update account data of the account related to a respective charging request. Rating engine 330 may pass an indication of the reserved service units to session control module 300 for return to the client or service element.

Management application 340 may include functionality for entering new logic into DCUD module 310, or for modifying existing logic of DCUD module 310. A user (e.g., an administrator of charging system 130) may use user I/F 350 to control the functionality of management application 340 to enter new logic into DCUD module 310 or to modify existing logic of DCUD module 310.

The functional components illustrated in FIG. 3 are shown by way of example. Other configurations with more functional components, fewer functional components, different functional components, or a different arrangement of functional components may be implemented. Moreover, in some embodiments, one or more functional components in FIG. 3 may perform one or more of the tasks described as being performed by one or more other functional components in FIG. 3.

Figure 4:
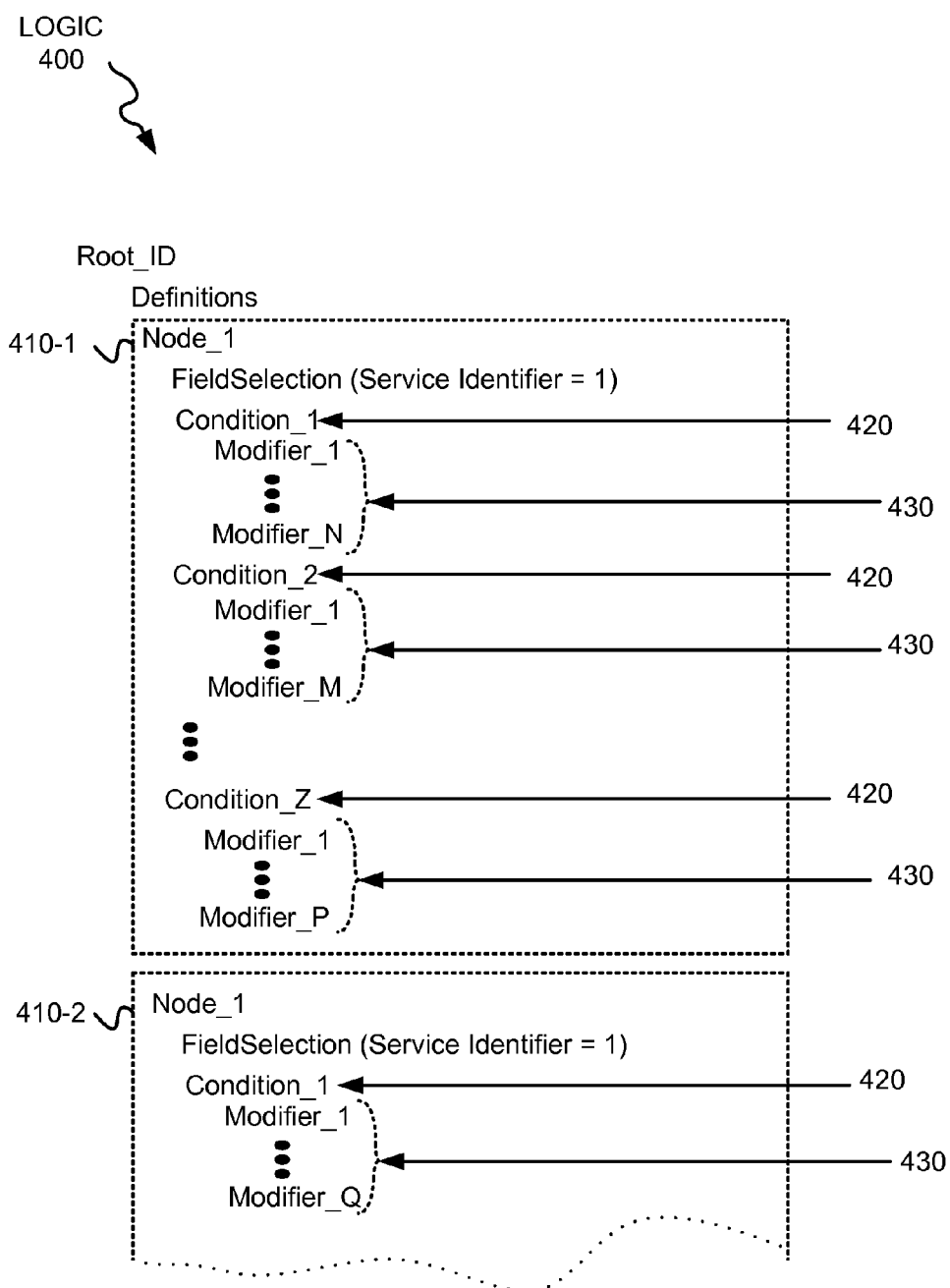
FIG. 4 illustrates an example of logic that may be used in the dynamic centralized unit determination module of FIG. 3.

FIG. 4 depicts an example of logic 400 that may be used by DCUD module 310 for performing, among other functions, unit determination. In the example of FIG. 4, logic 400 may be configured in a logical tree structure, where the logical tree may include multiple nodes (e.g., nodes 410-1 and 410-2 shown by way of example), each of which may act as a container that groups conditions 420, modifiers 430 and/or other nodes. The nodes in logic 400 may indicate the order of execution of logic in the logical tree structure, and each node in logic 400 may represent the beginning of a branch in the tree. The output of a node in logic 400 may be evaluated by using conditions 420 for the node. Conditions 420 may include logic decision points that can be evaluated as true or false (e.g., similar to IF and SET operations in a programming language). Modifiers 430 may perform calculations or data modifications based on whether a corresponding condition 420 is evaluated as being true or false. A modifier 430 may use, modify, or add data, and may also determine if the execution of logic 400 in a corresponding node should stop or continue.

Figure 5:
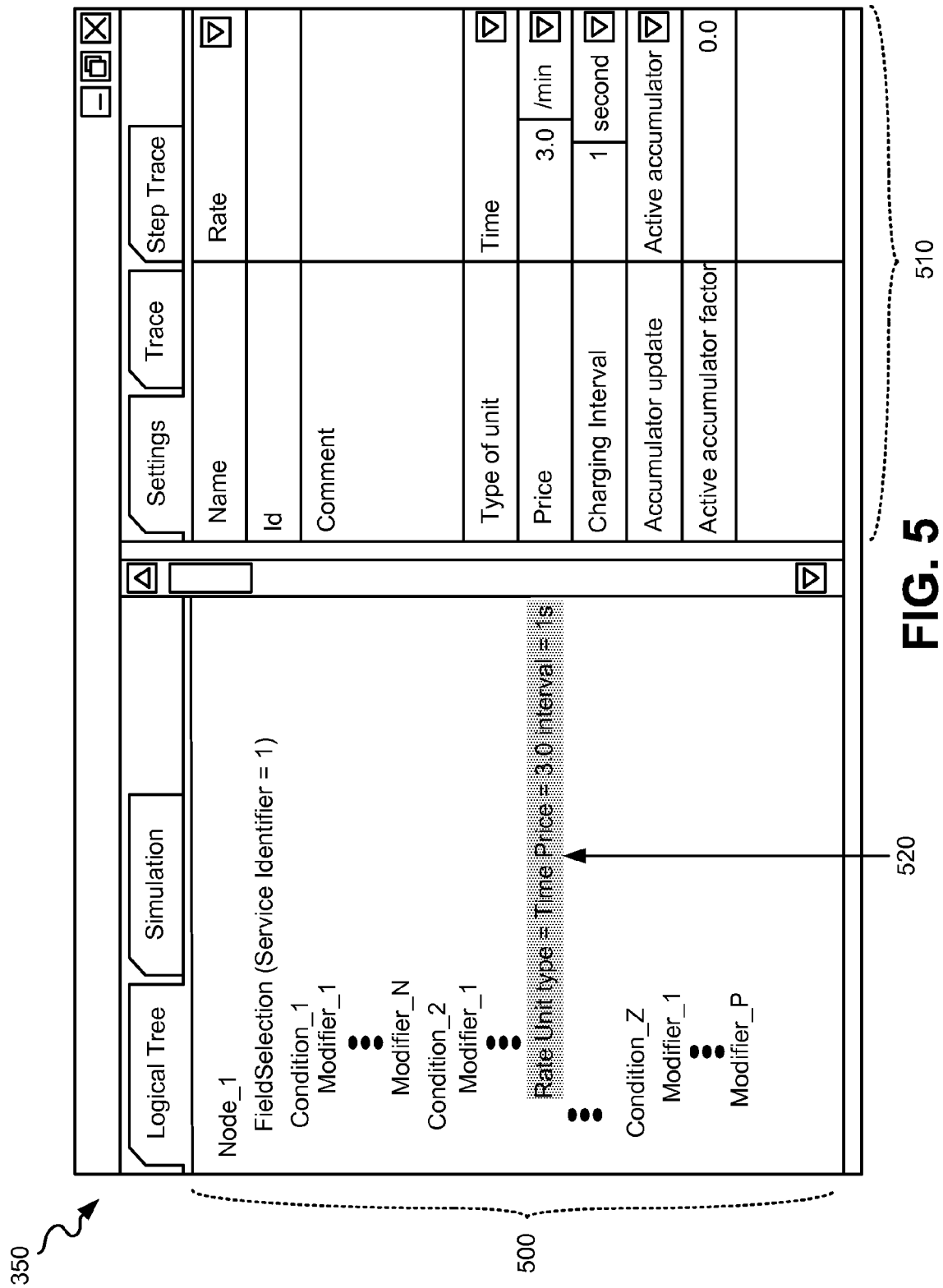
FIG. 5 illustrates an example of the user interface of FIG. 3.

FIG. 5 depicts an example of user I/F 350 that may be used to enter logic 400 that may further be used by DCUD module 310 for performing centralized unit determination based on input parameters and account data associated with a charging request, or for determining other charging session related parameters based on the input parameters, the account data, and/or other data associated with the charging request. As shown in FIG. 5, a first portion 500 of user I/F 350 may be used to enter logic (e.g., a logical tree), and a second portion 510 may be used to specify settings of components of the logic. For example, as shown in FIG. 5, portion 510 of I/F 350 may be used to specify settings of a modifier 520 of the logic, or to specify settings of a node or condition of the logic.

Figure 6:
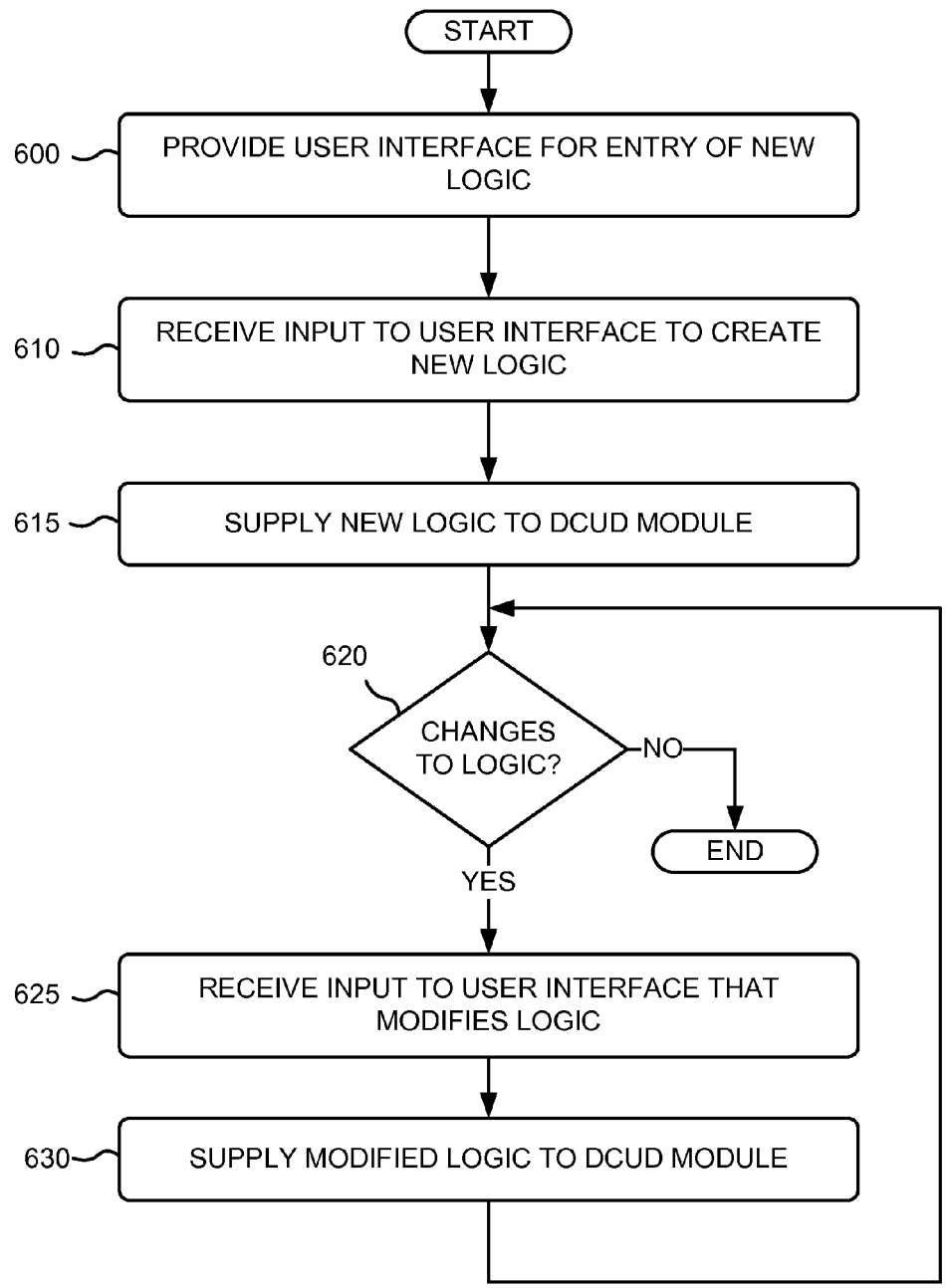
FIG. 6 is a flowchart that illustrates exemplary blocks associated with entering logic for use by the dynamic centralized unit determination module of FIG. 3.

FIG. 6 is a flowchart that illustrates an exemplary process for providing, and dynamically modifying, logic for use by DCUD module 310. The exemplary process of FIG. 6 may be performed by management application 340. Management application 340 may be implemented by charging system 130, or by another device or entity (not shown in FIGS. 1-3) communicating with charging system 130.

Figure 7:
FIG. 7 illustrates a specific example of a logical tree structure that may be used by the dynamic centralized unit determination module of FIG. 3.

The exemplary process may include providing a user interface for entry of new logic (block 600). Management application 340 may implement a user interface that a user (e.g., an administrator) may be use to enter new logic. For example, management application 340 may implement user I/F 350 depicted in FIG. 5. Input to the user interface may be received to create new logic (block 610). For example, referring to user I/F 350 depicted in FIG. 5, a user may enter logic in portion 500 of the user I/F, and may specify settings of the various nodes, conditions, and modifiers of the logic in portion 510 of the user FF. The new logic may be supplied to DCUD module 310 (block 615). Management application 340 may supply the newly entered logic to DCUD module 310 via user I/F 350. FIG. 7 depicts one example of a logical tree structure 700 that may be entered by a user via user I/F 350. In the example logical tree 700, a service unit type for the requested service units may be determined based on a roaming position of an end user 105 associated with the request for service units.

Returning to FIG. 6, it may be determined if changes are to be made to the logic (block 620). For example, management application 340, based on input from a user, may retrieve previously entered logic for entering changes to the logic. If changes are to be made to the logic (block 620-YES), input to the user interface may be received that modifies the logic (block 625). The user (e.g., the administrator) may supply input to I/F 350 that modifies the previously entered logic. The modified logic may be supplied to DCUD module 310 (block 630). Management application 340 may supply the modified logic to DCUD module 310 via user I/F 350.

The blocks of FIG. 6 may be selectively repeated for each group of logic entered by a user via user I/F 350. The blocks depicted in FIG. 6 are shown by way of example. The exemplary process may include other blocks, fewer blocks, different blocks, or a different arrangement of blocks than those depicted in FIG. 6.

Figure 8:
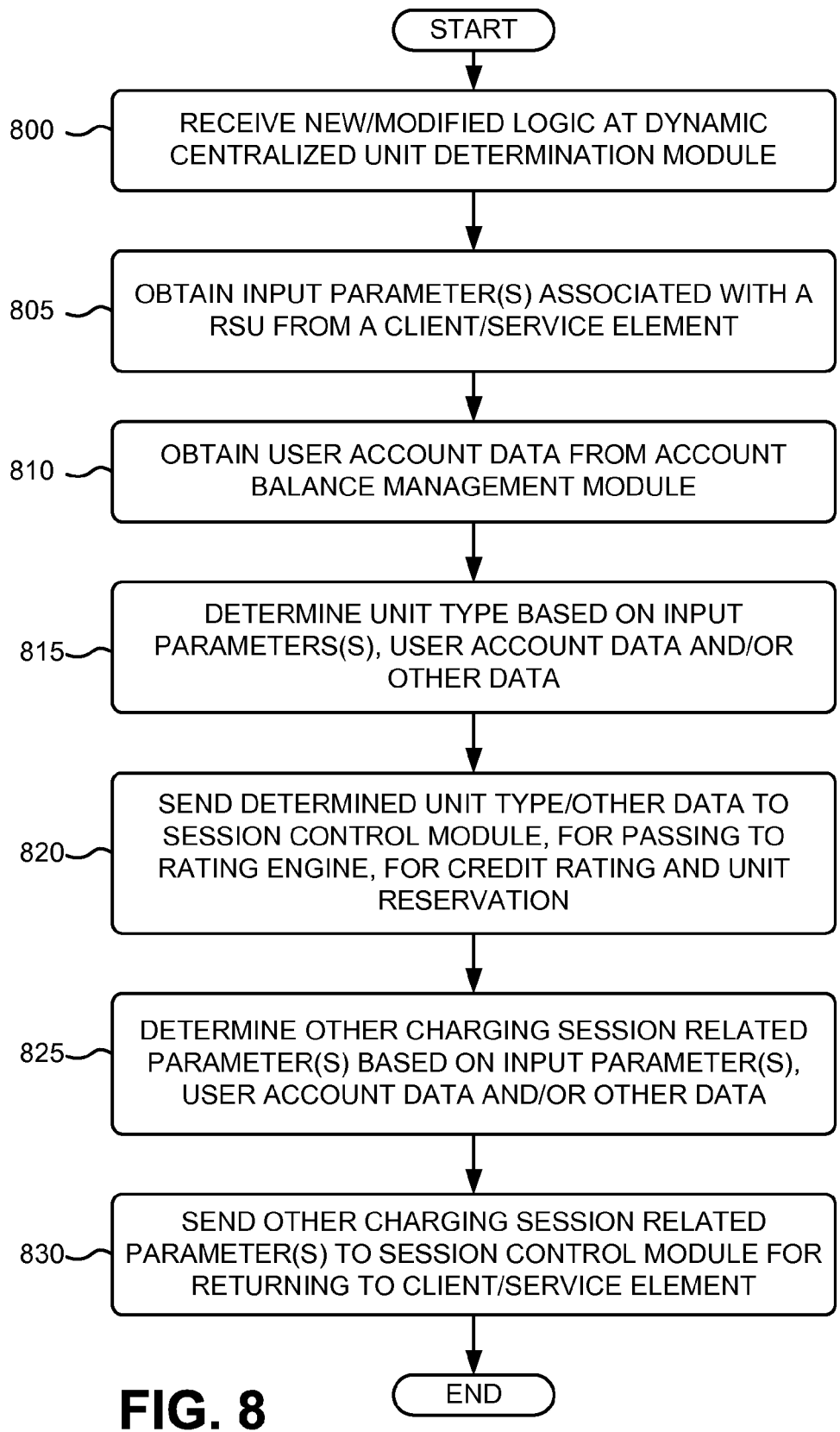
FIG. 8 is a flowchart that illustrates an exemplary process for processing request for service units received from a client(s)/service element(s), and for determining other charging session related parameters associated with the service request.

FIG. 8 is a flowchart that illustrates an exemplary process for processing request for service units (RSUs) received from a client(s)/service element(s), and for determining other charging session related parameters associated with the service request(s). The exemplary process of FIG. 8 may be performed by the logic implemented by DCUD module 310, possibly in conjunction with other components of charging system 130. The exemplary process of FIG. 8 is described below with reference to the example of FIG. 9.

Figure 9:
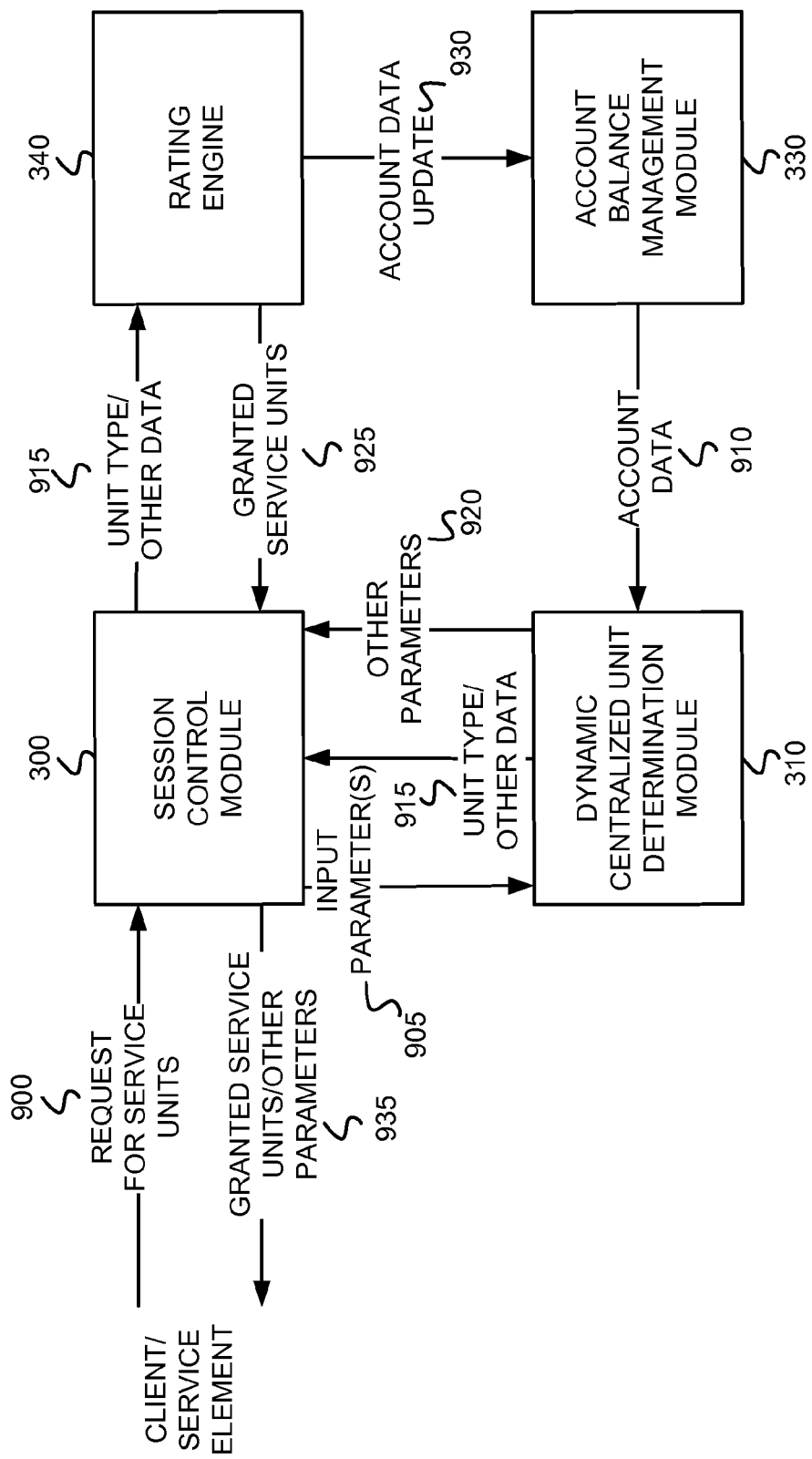
FIG. 9 illustrates the functional components of FIG. 3 implementing the exemplary process of FIG. 8.

The exemplary process may include receiving new and/or modified logic at DCUD module 130 (block 800). In accordance with blocks 615 or 630 of the exemplary process of FIG. 6, management application 340 may supply new or modified logic to DCUD module 130 via user I/F 350. DCUD module 310 may obtain an input parameter(s) associated with a request for service units (RSU) received from a client or service element (block 805). Referring to FIG. 9, session control module 300 may receive a request for service units (RSU) 900 from the client or service element, may extract an input parameter(s) 905 from the received RSU, and may pass input parameter(s) 905 to DCUD module 310. DCUD module 310 may obtain user account data from account balance management module 330 (block 810). As shown in FIG. 9, account balance management module 330 may pass account data 910 that is associated with RSU 900 (i.e., account data associated with end user 105 for which the service units are being requested) to DCUD module 310.

DCUD module 310 may determine a service unit type based on the input parameter(s), the user account data, and/or other data (block 815). DCUD module 310 may implement the logic received in block 800 to determine the service unit type to be granted. For example, if the logic includes a logical tree structure, DCUD module 310 may apply one or more conditions and modifiers (described above) to determine the service unit type to be granted. DCUD module 310 may determine the service unit type based on, for example, an SGSN address associated with the location of the end user, a GGSN address associated with the location of the end user, a MCC associated with a location of the end user, a MNC associated with a location of the end user, a campaign identifier associated with an advertising campaign in which the end user is participating; a time of day associated with a time a request for service units is received by charging system 130, or a traffic service class associated with the request for service units.

DCUD module 310 may send the determined service unit type to session control module 300, for passing to rating engine 340, for credit rating and service unit reservation (block 820). As shown in FIG. 9, DCUD module 310 may pass the service unit type/other data 915 to session control module 300. Session control module 300 may further pass service unit type/other data 915 to rating engine 340 for credit rating and service unit reservation. Upon receipt of service unit type/other data 915, rating engine 340 may grant service units, of the determined service unit type, to the client/service element. Rating engine 340 may pass the granted service units 925 to session control module 300. Rating engine 340 may also send an account data update 930 to account balance management module 330 to update values stored in the account associated with end user 105 for which the grant of service units is directed.

DCUD module 310 may determine other charging session related parameter(s) based on the input parameter(s), user account data, and/or other data (block 825). DCUD module 310 may implement the logic received in block 800 to determine the other charging session related parameter(s). For example, if the logic includes a logical tree structure, DCUD module 310 may apply one or more conditions and modifiers (described above) to determine the other charging session related parameter(s) based on the input parameter(s), user account data, and/or other data. The other charging session related parameter(s) may include one or more of the following parameters that are defined in "Diameter Charging Applications," 3GPP TS 32.299 V7.7.0 2007-09: 1) a trigger parameter(s); 2) a threshold parameter(s); 3) a Continuous Time Period (CTP) or Discrete Time Period (DTP) parameter(s); 4) an envelope reporting parameter(s); 5) a Quota Holding Time (QHT) parameter(s); and 6) a Quota Consumption Time (QCT) parameter(s). For example, the QCT parameter(s) may be determined based on account data associated with the end user (e.g., based on whether the end user is participating in a particular offer or is a member of a particular group). The QCT parameter(s) may inform the client or service element to "over consume" (i.e., consume service units even though no traffic flows) during a time period specified by the QCT parameter(s). As another example, the CTP or DTP parameters may be determined based on account data associated with the end user (e.g., based on whether the end user is participating in a particular offer or is a member of a particular group). The CTP or DTP parameters may inform the client or service element of time envelopes which define rules of consumption to be applied to downloaded service units.

DCUD module 310 may send the other charging session related parameter(s) to session control module 300 for returning to the client or service element (block 830). As shown in FIG. 9, DCUD module 310 may pass the other charging session related parameter(s) 920 to session control module 300. Session control module 300 may pass granted service units 935 of the determined service unit type, and the other charging session related data (if any) to the client/service element.

The blocks depicted in FIG. 8 are shown by way of example. The exemplary process may include other blocks, fewer blocks, different blocks, or a different arrangement of blocks than those depicted in FIG. 8.

FIGS. 10-15 depict several examples of the determination of service unit type and/or other charging session related data as performed by DCUD module 310 of charging system 130, and the granting of service units for a charging session. FIGS. 10-15 are intended to merely represent several examples of the determination of service unit type and/or other charging session related data, and not to represent all of the numerous examples of service unit type or other charging session related data determination that may be implemented by DCUD module 310.

Figure 10:
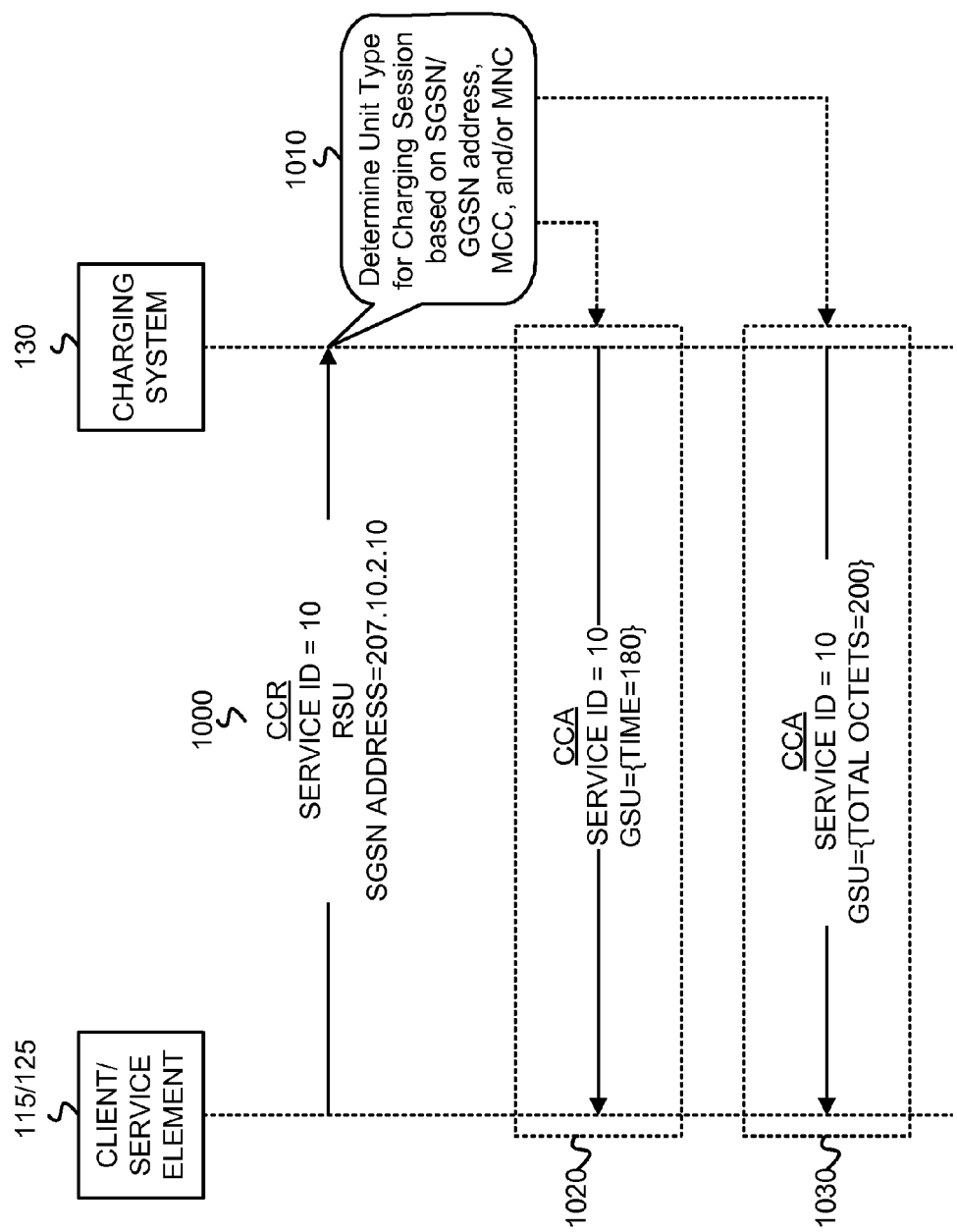
FIGS. 10-15 illustrate specific examples of centralized unit type determination, or the determination of other charging session related data, based on input parameters contained in a request for service units and based on an end user's account data.

In the example of FIG. 10, a client 115 or service element 125 (e.g., a GGSN) sends a credit control request (CCR) 1000 to charging system 130, where the input parameters contained in CCR 1000 may include the following: a service identifier, a request for service units (RSUs), and a location identifier. The location identifier may include any type of data that provides an exact, or approximate, location of end user 105 with which the CCR is associated. For example, the location identifier may include an SGSN address (i.e., of SGSN 115-M that is serving end user 105), a Mobile Country Code (MCC), and/or a Mobile Network Code (MNC). At charging system 130, DCUD module 310 may determine 1010 a service unit type for the charging session based on the SGSN address, the GGSN address, the MCC, and/or the MNC. In the example of FIG. 10, charging system 130 is depicted as determining one of two service unit types based on the SGSN address, the GGSN address, the MCC, and/or the MNC. For example, DCUD module 310 (not shown) of charging system 130 may determine a service unit type of time or a service unit type of data based on the SGSN address, the GGSN address, the MCC, and/or the MNC. FIG. 10 depicts charging system 130 sending a credit control answer (CCA) 1020 with a granted service units (GSUs) being a service unit type of time with a value of 180 seconds if the SGSN/GGSN address, MCC and/or MNC indicates that end user 105 is roaming. FIG. 10 further depicts charging system 130 sending a CCA 1030 with the GSUs being a service unit type of data volume, having a value of 200 octets of data, if the SGSN/GGSN address, MCC, and/or MNC indicates that end user 105 is not roaming.

Figure 11:
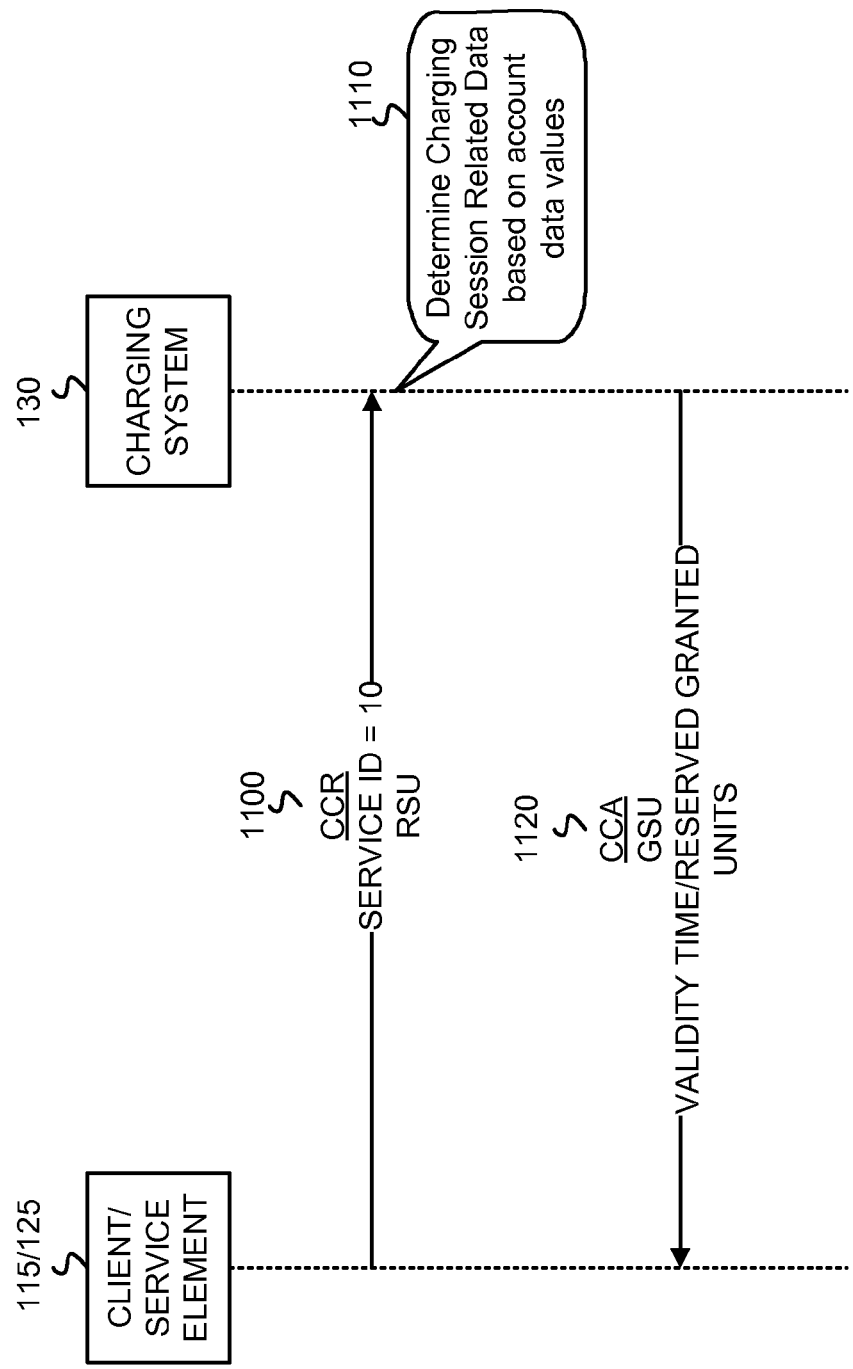

FIG. 11 illustrates another example in which other charging session related data is determined by DCUD module 310 of charging system 130 based on input parameters contained in the RSU. As shown in FIG. 11, a client 115 or service element 125 may send a CCR 1100 to charging system 130 to request service units. Upon receipt of CCR 110 at charging system 130, DCUD module 310 may determine 1110 charging session related data, that may include data other than a service unit type, based on account data values associated with CCR 1100. For example, the charging session related data may include an amount of GSU and a length of a validity time that, when the validity time elapses, causes client 115 or service element 125 to report consumption for deduction from the account. In this example, the more money that is associated with the account, the larger the amount of GSU and the longer the validity time that may be determined by DCUD module 310. In the example of FIG. 11, CCA 1120, including an amount of GSU and a validity time, may be sent to client 115 or service element 125.

Figure 12:
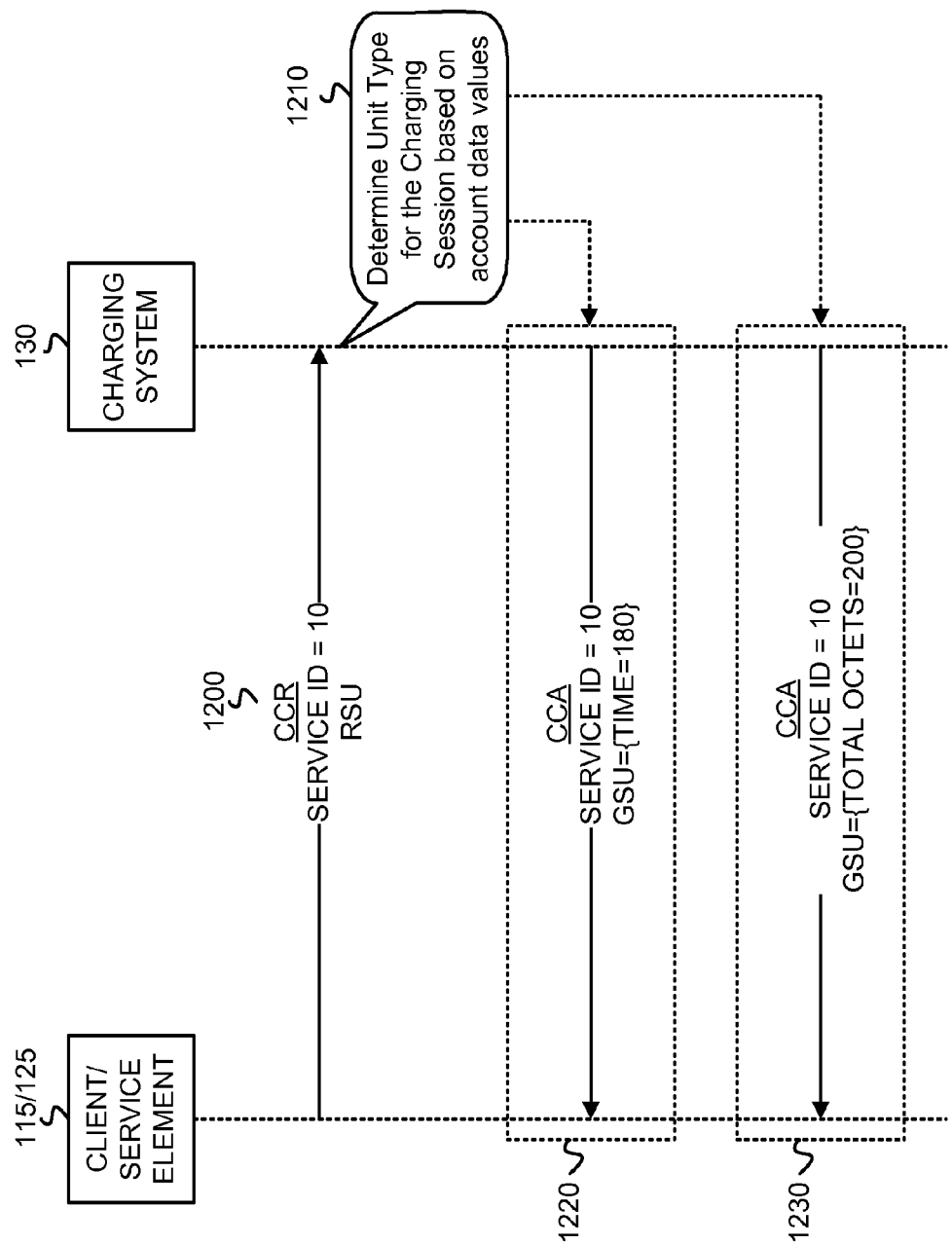

FIG. 12 illustrates a further example in which a client 115 or service element 125 may send a CCR 1200 to charging system 130 to request service units. Upon receipt of CCR 1200 at charging system 130, DCUD module 310 may determine 1210 a service unit type for the charging session based on account data values associated with end user 105 with which the request for service units is associated. FIG. 12 depicts charging system 130 sending two different CCAs 1220 or 1230 depending on the account data values of the account associated with end user with which the request for service units is associated. In the example of FIG. 12, CCA 1220, including service unit type of time, and a length of time of 180 seconds, may be sent to client 115 or service element 125 if the account data values satisfy a first condition; or CCA 1230, having a service unit type of data, and an amount of 200 data octets, may be sent to client 115 or service element 125 if the account data values satisfy a second condition.

Figure 13:
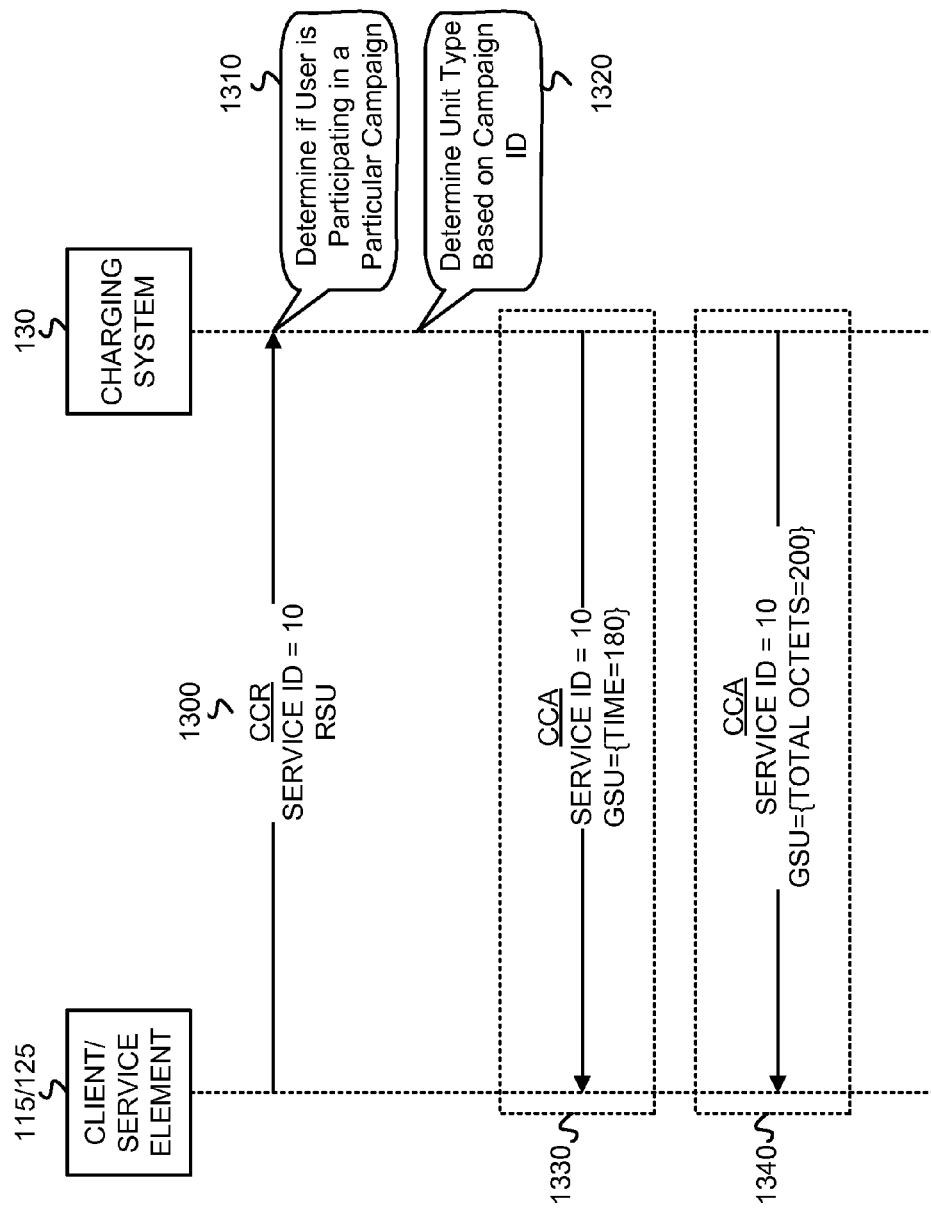

FIG. 13 illustrates a further example in which a client 115 or service element 125 may send a CCR 1300 to charging system to request service units. Upon receipt of CCR 1300 at charging system 130, DCUD module 310 may determine 1310 if end user 105, with which the request for service units is associated, is participating in a particular offer or advertised campaign. For example, a particular campaign offered by a provider may offer different prices for specific service unit types (e.g., $10 for an hour of service, or $1 for a Megabyte (Mb) of transmitted data, etc.). Therefore, in the example of FIG. 13, DCUD module 310 of charging system 130, upon receipt of CCR 1300, may determine 1310 if the end user is participating in a particular offered campaign and, if so, may determine 1320 a service unit type based on the campaign's identifier. Charging system 130 may return a CCA to client 115 or service element 125 with a grant of service units of the service unit type determined by DCUD module 310. In the example depicted in FIG. 13, charging system 130 may return a CCA 1330 with a service unit type of time and a time length of 180 seconds if it is determined that end user 105 is not participating in the campaign (e.g., a campaign offering a data volume for a specific price). Alternatively, charging system 130 may return a CCA 1340 with a service unit type of data volume, and an amount of 200 data octets, if it is determined that end user 105 is participating in the campaign.

Figure 14:
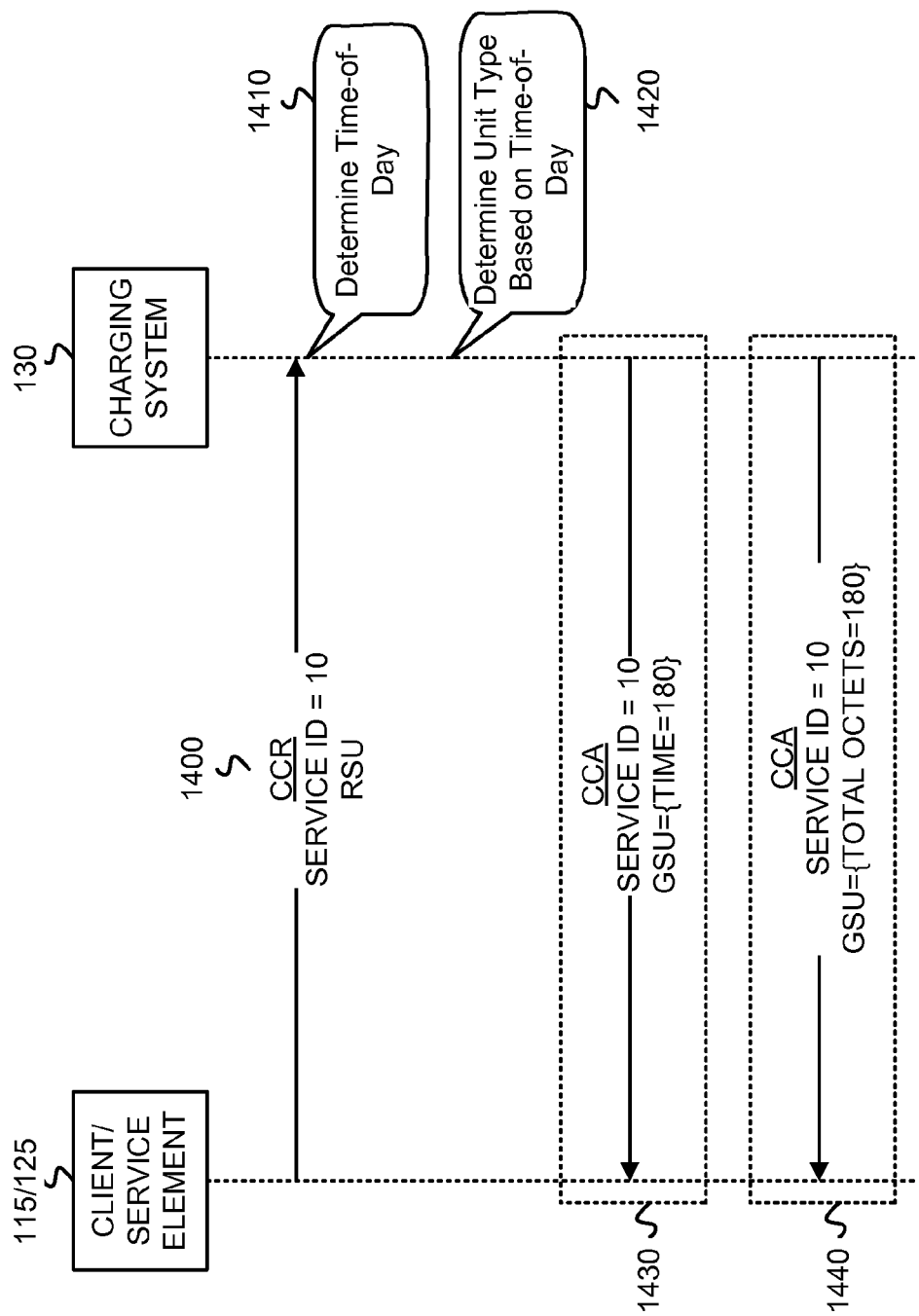

FIG. 14 illustrates a further example in which a client 115 or service element 125 may send a CCR 1400 to charging system 130 to request service units. Upon receipt of CCR 1400 at charging system 130, DCUD module 310 may determine 1410 a current time (i.e., the time of day) at which CCR 1400 is received. DCUD module 310 may further determine 1420 a service unit type based on the time of day (e.g., unit type=data volume during the day, unit type=time during the night). Charging system 130 may return a CCA to client 115 or service element 125 with a grant of service units of the service unit type determined by DCUD module 310. In the example depicted in FIG. 14, charging system 130 may return a CCA 1430 with a service unit type of time and a time length of 180 seconds if the time-of-day is determined to be the nighttime. Alternatively, charging system 130 may return a CCA 1440 with service unit type of data volume (e.g., total octets=180) if the time-of-day is determined to be the daytime.

Figure 15:
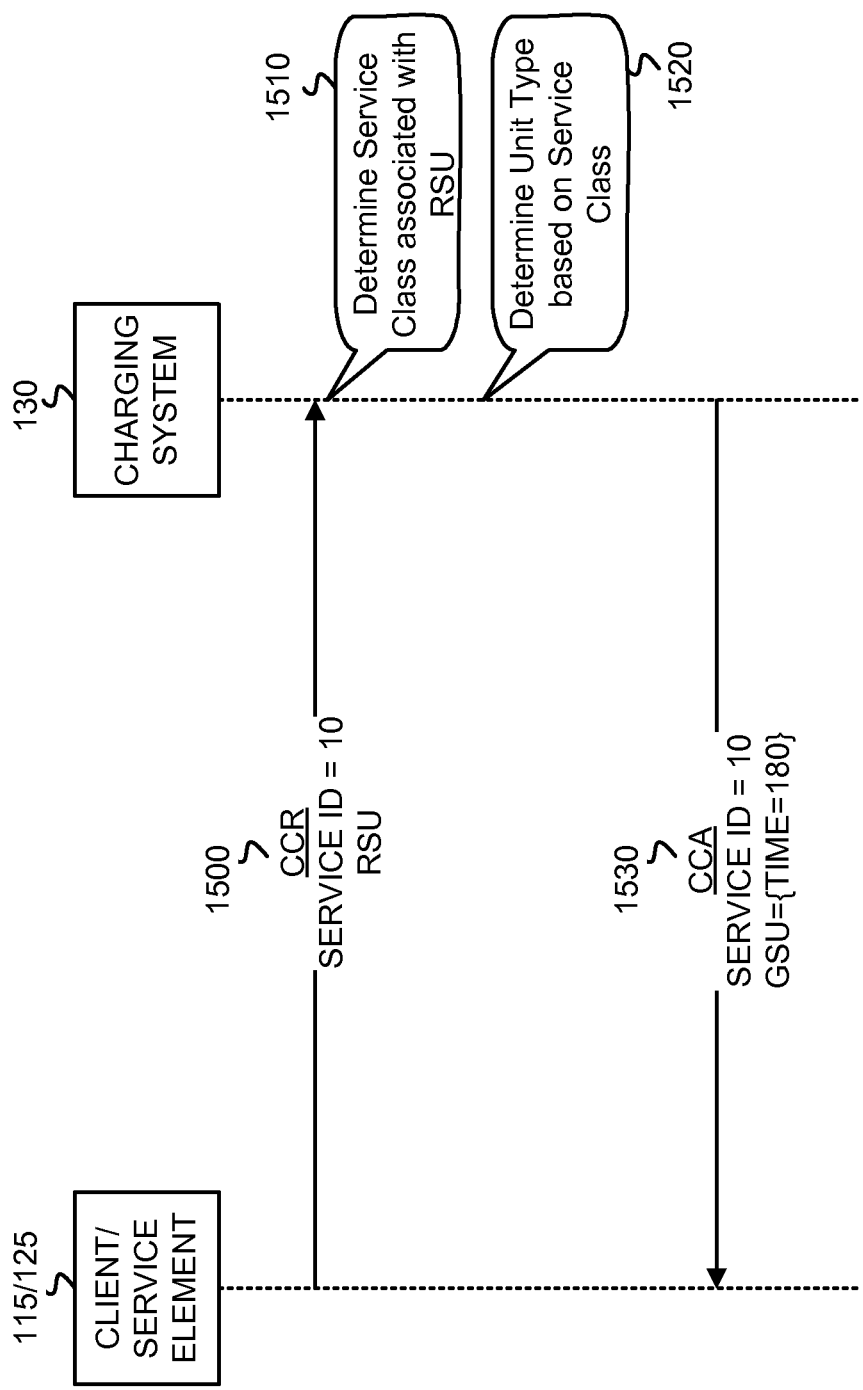

FIG. 15 illustrates yet another example in which a client 115 or service element 125 may send a CCR 1500 to charging system 130 to request service units. Upon receipt of CCR 1500 at charging system 130, DCUD module 310 may determine a service class associated with the request for service units. Charging system 130 may support multiple service classes (e.g., Gold, Silver, and Bronze), where different service unit types may be associated with each of the different service classes (e.g., a service unit type of time for the Gold service class, and a service unit type of volume for Silver and Bronze service classes). DCUD module 130 may then determine 1520 a service unit type based on the determined service class. Charging system 130 may return CCA 1530 to client 115 or service element 125 with a grant of service units of the service unit type determined by DCUD module 310. In the example depicted in FIG. 15, charging system 130 may return CCA 1530 with a service unit type of time and a time length of 180 seconds.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 6 and 8, the order of the blocks may be modified in other implementations consistent with the principles of the invention. Further, non-dependent blocks may be performed in parallel.

Aspects described herein may also be implemented in methods and/or computer program products. Accordingly, the embodiments described herein may be embodied in hardware and/or in a combination of hardware and software (including firmware, resident software, microcode, etc.). Furthermore, embodiments described herein may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A credit control server, comprising:
   a rating engine;
   a session control module configured to:
      receive a request for service units, associated with a charging session, from a client or service element that is providing a network service to an end user; and
      obtain one or more input parameters from the request for service units and passing the one or more input parameters to a charging unit determination module;
   the charging unit determination module configured to:
      obtain account data associated with the request for service units from an account balance management module;
      determine, based on a dynamically configurable logic, a unit type based on the account data; and
      pass the determined unit type to the rating engine;
   wherein the rating engine is configured to:
      rate credit and grant service units based on at least the determined unit type; and
      forward an indication of the granted service units of the determined unit type to the session control module for return to the client or service element.

2. The credit control server of claim 1, where the unit type comprises one of time, volume or money.

3. The credit control server of claim 1, where the one or more input parameters comprises at least one of a Serving General Packet Radio System (GPRS) Support Node (SGSN) address, a gateway GPRS support Node (GGSN) address, a mobile country code (MCC), or a mobile network code (MNC).

4. The credit control server of claim 1, where the account data includes an identifier of a campaign in which a user of the client or service element is participating.

5. The credit control server of claim 1, where the charging unit determination module is configured to generate the unit type based on a time of day associated with the request for service units, where the least one charging session related parameter includes a unit type associated with the request for service units.

6. The credit control server of claim 1, where the dynamically configurable logic includes conditions and modifiers for generating the unit type.

7. The credit control server of claim 1, where the dynamically configurable logic includes JavaScript, Python, or Perl programmable logic.

8. The credit control server of claim 6, where the dynamically configurable logic includes logical trees and where the charging unit determination module is configured to:
   branch, within the logical trees, using the account data and the one or more input parameters and based on the conditions, to execute the modifiers to determine the unit type.

9. The credit control server of claim 1, where the charging unit determination module is configured to:
   receive modifications to the dynamically configurable logic via the user interface.

10. The credit control server of claim 1, where the charging unit determination module is configured to determine unit type based on the one or more input parameters.

11. A method implemented in a credit control server, the method comprising:
   receiving a request for service units, associated with a charging session, from a client or service element that is providing a network service to an end user;
   obtaining one or more input parameters from the request for service units;
   obtaining account data associated with the request for service units;
   determining, based on a dynamically configurable logic, a unit type based on the account data;
   credit rating and granting service units based on at least the determined unit type; and
   sending an indication of the granted service units of the determined unit type to the client or service element.

12. The method of claim 11, where the unit type comprises one of time, volume or money.

13. The method of claim 11, where the one or more input parameters comprises at least one of a Serving General Packet Radio System (GPRS) Support Node (SGSN) address, a gateway GPRS support Node (GGSN) address, a mobile country code (MCC), or a mobile network code (MNC).

14. The method of claim 11, where the determining the unit type is based on a time of day associated with the request for service units, and where the least one charging session related parameter includes a unit type associated with the request for service units.

15. The method of claim 11, further comprising:
   receiving dynamically configurable logic via a user interface, and determining the unit type based further on the dynamically configurable logic.

16. The method of claim 11, where the dynamically configurable logic includes conditions and modifiers for generating the unit type.

17. The method of claim 11, where the dynamically configurable logic includes JavaScript, Python, or Perl programmable logic.

18. The method of claim 16, where the dynamically configurable logic includes logical trees, the method further comprising:
   branching, within the logical trees, using the account data and the one or more input parameters and based on the conditions, to execute the modifiers to determine the unit type.

19. The method of claim 11, the method further comprising:
   receiving modifications to the dynamically configurable logic via the user interface.

* * * * *

UNITED STATES PATENT AND TRADEMARK OFFICE
CERTIFICATE OF CORRECTION

PATENT NO.        : 8,473,379 B2                                              Page 1 of 1
APPLICATION NO.   : 12/650365
DATED             : June 25, 2013
INVENTOR(S)       : Ahlgren et al.

It is certified that error appears in the above-identified patent and that said Letters Patent is hereby corrected as shown below:

On the Title Page

On Page 2, Item (56), under "OTHER PUBLICATIONS", in Column 2, Line 10, delete "networkds" and insert -- networks --, therefor.

In the Drawings

In Fig. 8, Sheet 9 of 16, for Tag "815", in Line 2, delete "PARAMETERS(S)," and insert -- PARAMETER(S), --, therefor.

In the Specification

In Column 4, Line 36, delete "a Internet" and insert -- an Internet --, therefor.

In Column 9, Line 8, delete "DCUD module 130" and insert -- DCUD module 310 --, therefor.

In Column 9, Line 11, delete "DCUD module 130" and insert -- DCUD module 310 --, therefor.

In Column 11, Line 15, delete "CCR 110" and insert -- CCR 1100 --, therefor.

In Column 12, Line 32, delete "DCUD module 130" and insert -- DCUD module 310 --, therefor.

Signed and Sealed this
Twenty-second Day of July, 2014

Michelle K. Lee
*Deputy Director of the United States Patent and Trademark Office*